Patented Apr. 18, 1933

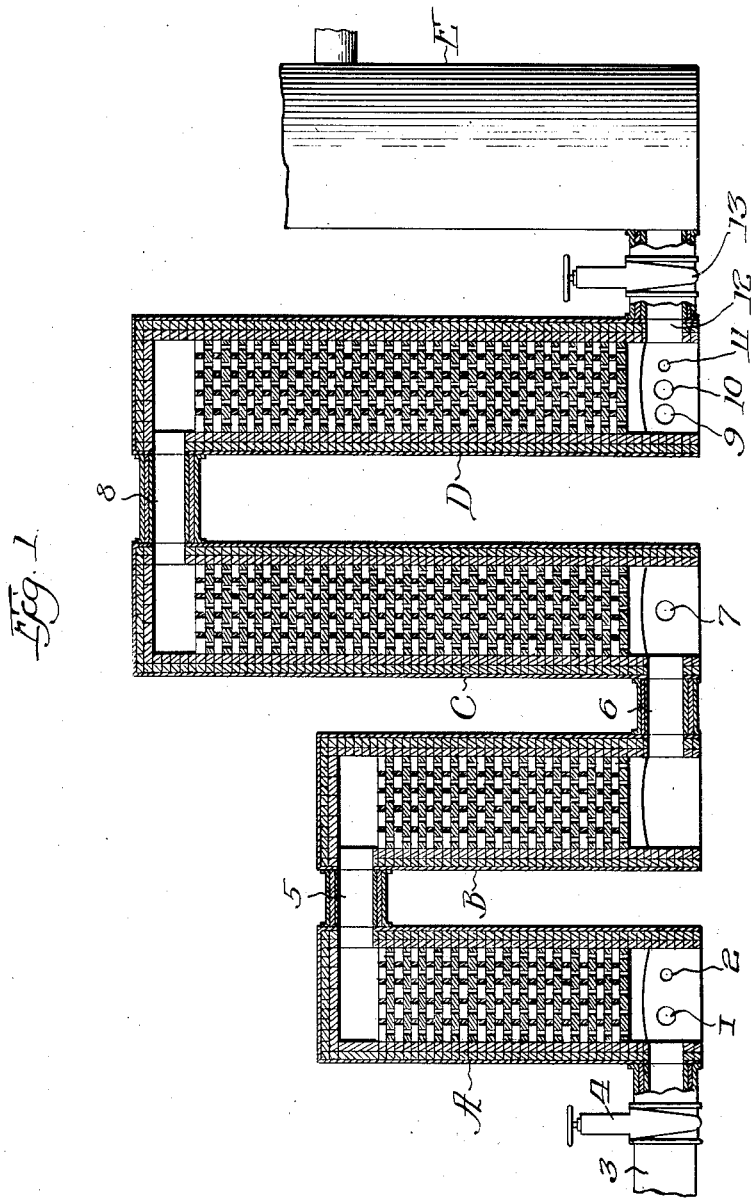

1,903,845

UNITED STATES PATENT OFFICE

WILLIAM D. WILCOX, OF IDAHO FALLS, IDAHO

PROCESS OF CONVERTING NATURAL GAS AND SIMILAR GASEOUS HYDROCARBONS INTO A MIXTURE OF CARBON MONOXIDE AND HYDROGEN IN CONTROLLED PROPORTIONS

Application filed August 29, 1928. Serial No. 302,876.

During a recent period there have been developed on a commercial scale, processes by which a mixture of carbon monoxide and hydrogen in the proportion of one volume of carbon monoxide and two volumes of hydrogen is, by heat and pressure in the presence of a suitable catalyst, caused to unite according to the equation CO plus $2H_2 = CH_3OH$, forming wood alcohol or methanol. It is the particular purpose of my invention to provide a practical and effective means by which natural gas or similar hydrocarbon gases derived from coal, petroleum or shale, may be transformed into a mixture of carbon monoxide and hydrogen in definite proportions suitable for use in the synthesis of methanol. The process can be better understood by reference to the accompanying drawing which shows a central vertical cross section of the apparatus which may be used.

A, B, C and D are connected conduits preferably constructed in the cylindrical form with outer jackets of steel, a lining of heat insulating material and an inner lining of highly refractory material and filled for the most part with checker brick of a quality highly resistant to heat.

E is a steam boiler.

1 is an air inlet.

2 is a steam inlet.

3 is the outlet provided for the withdrawal of the conserved gases.

4 is a valve closing this outlet.

5 is a passage connecting A and B.

6 is a passage connecting B and C.

7 is an inlet for the admission of a combustible gas which will, where natural gas is available, be preferably drawn from the same supply used to supply the gas which forms the raw material of the process.

8 is a passage connecting C and D.

9 is an inlet for the admission of carbon dioxide or oxygen.

10 is an inlet for the admission of the hydrocarbon gases which it is proposed to disassociate.

11 is a steam inlet.

12 is a passage connecting D with the base of the steam boiler E.

13 is a valve by which this passage may be closed.

*Operation.*—Operation is begun by admitting air through 1 and combustible gas through 7 under sufficient pressure to cause an adequate inflow of each and so regulated that the volume of air will be sufficient to secure a complete combustion of the gas. Valve 4 is closed, valve 13 is open. The gas entering 7 is ignited. Active combustion takes place within C and D. The hot gases pass from D into the steam boiler E for the production of steam. This combustion is continued until the walls and checker brick of C and D have been brought to a high temperature. The temperature in the lower part of C must be substantially in excess of 2000° F. 1 and 7 are now closed. Steam is admitted through 2 in sufficient volume to drive the air and combustion products in the conduits through into E. Valve 13 is now closed, valve 4 opened. Gas is admitted through 10, steam through 11, under sufficient pressure to cause them to flow through the conduits toward outlet 3, and in controlled proportions. They become progressively heated in this travel, and when brought to a temperature of 2000° F. or higher in conduit C, the hydrocarbon gases will be broken up, the carbon being released as a solid, the hydrogen as a gas. Similarly steam at this temperature in the presence of carbon is broken up, its hydrogen content being released as a gas, the oxygen uniting with adjacent carbon to form carbon monoxide. Where natural gas is used as the material, the principal reactions will be as follows: (methane) $CH_4$ plus $H_2O = CO$ plus $3H_2$. (Ethane) $C_2H_6$ plus $2H_2O = 2CO$ plus $5H_2$. It will be noted that due to the production of hydrogen from the steam, the product of hydrogen is more than double that of the carbon monoxide. The proportion of these gases may be controlled by using carbon dioxide admitted through 9 to take up a portion of the carbon together with a reduced proportion of steam. Using carbon dioxide the reaction with methane may be represented by the following equation: $CH_4$ plus $CO_2 = 2CO$ plus $2H_2$. Carbon dioxide can be quite readily obtained by conserving the combustion gases passing from E, washing them with an alkaline solution and later heating this solution to release the carbon dioxide and regenerate the absorbent. A pure oxygen, if available, might be used for the same purpose, the reaction with methane being represented by the following equation: $2CH_4$ plus $O_2 = 2CO$ plus $4H_2$, but except where special facilities for the cheap separation of oxygen from the air are available the use of carbon dioxide and a larger proportion of steam will be preferable. A certain amount of heat is absorbed where methane and other hydrocarbon gases with the exception of acetylene are disassociated. The breaking up of the steam molecule is highly endothermic, absorbing much more heat than is generated by the union of the oxygen with carbon. The reaction $C$ plus $CO_2 = 2CO$ is endothermic. Heat stored in the walls and checker brick of C and D is gradually absorbed until the temperature falls below a level at which the desired reaction is completed. The admission of gas is stopped by closing inlets 9 and 10. The admission of steam is continued until the gases admitted have been carried forward through 3. This steam will unite with any carbon deposited upon the walls and checker brick in the conduit so long as the temperature remains at around 1800 degrees F., or higher, according to the water gas reaction, $C$ plus $H_2O$ equals $C$ plus $H_2$. The steaming will therefore be continued until a substantial volume has passed into admixture with the gases generated in the preceding cycle. 11 and 4 are now closed, 13 opened. The hot gases passing through B and A from C have in the preceding cycle imparted considerable heat to the walls and checker brick of A and B. When we now admit air through 2 to burn the combustible gas admitted through 7, it enters the base of C highly superheated and as a result, an increased flame temperature is produced and a much higher temperature can be imparted to the walls and checker brick of C and D. The use of the sensible heat of the conserved gases in preheating the air is regarded as a part of the process of the highest practical value for the reason that the only heat usable in the process is that in excess of 2000° F. The heating of the air reduces the amount of gas necessarily consumed in reheating, improves the effectiveness of the disassociation process and extends the length of the disassociating cycle. The use of pressures higher than atmospheric, but not so high as to prevent disassociation is contemplated as a means of increasing the output obtained from the conduits in unit time, and it is also in contemplation that catalysts placed in A and B may be used to promote disassociation at a temperature less than 2000° F., but this use of catalysts forms no part of the process which I desire to protect by the issuance to me of Letters Patent.

What I claim as new is:

1. The process of obtaining a mixture of carbon monoxide and hydrogen in determined proportions by the dissociation of hydrocarbon gases and vapors, which comprises heating the interior of a conduit having a filling of refractory material to a temperature in excess of 2000° F. by burning combustible gas within the conduit, then admitting to the conduit a mixture of hydrocarbon gases with a controlled volume of steam and passing it through the conduit in a direction counter current to the travel of the combustion gases within the conduit, thence through a regenerator chamber having a filling of refractory material, withdrawing the gases; in the reheating cycle, passing the air which supports combustion through the regenerator in a direction counter current to the travel of the conserved gas.

2. The process of obtaining a mixture of carbon monoxide and hydrogen in determined proportions by the dissociation of hydrocarbon gases and vapors, which comprises heating the interior of a conduit having a filling of refractory material to a temperature in excess of 2000° F. by maintaining an active combustion therein, then passing in contact with the heated interior hydrocarbon gases and vapors together with a volume of carbon dioxide sufficient to supply any deficiency in the desired ratio of carbon to hydrogen in the final product, and a volume of steam adequate to supply by its dissociation oxygen to oxidize to carbon monoxide any carbon in the hydrocarbons not oxidized to carbon monoxide by the oxygen in the carbon dioxide, withdrawing and cooling the resultant gases.

3. The process of obtaining a mixture of carbon monoxide and hydrogen in determined proportions by the dissociation of hydrocarbon gases and vapors, which comprises heating the interior of a conduit having a filling of refractory material to a temperature in excess of 2000° F. by maintaining an active combustion therein, then passing through the conduit in a direction counter current to the travel of the combustion gases through the conduit hydrocarbon gases, together with a volume of carbon dioxide gas sufficient to supply any deficiency in the desired ratio of carbon to hydrogen in the final product, and a volume of steam adequate to supply by its dissociation oxygen to oxidize to carbon monoxide any carbon in the hydrocarbons not oxidized to carbon monoxide by the oxygen in the carbon dioxide, withdrawing and cooling the resultant gases.

4. The process of obtaining a mixture of carbon monoxide and hydrogen by the dissociation of hydrocarbon gases and vapors, which comprises heating the interior of a conduit having a filling of refractory material to a temperature in excess of 2000° F. by maintaining an active combustion therein, then passing through the conduit in a direction counter current to the travel of the combustion gases, hydrocarbon gases and vapors, together with a volume of carbon dioxide sufficient to supply any deficiency in the desired ratio of carbon to hydrogen in the final product and a volume of steam adequate to supply by its dissociation oxygen to oxidize to carbon monoxide any carbon in the hydrocarbons not oxidized to carbon monoxide by the oxygen in the carbon dioxide, passing the resultant gases through a regenerator chamber having a filling of refractory material and withdrawing them, thereafter passing the air which supports combustion in the subsequent reheating cycle through the regenerator in a direction counter current to the travel of the conserved gas.

5. The process of obtaining a mixture of carbon monoxide and hydrogen in determined proportions by the dissociation of hydrocarbon gases and vapors, which comprises heating the interior of a conduit having a filling of refractory material to a temperature in excess of 2000° F. by maintaining an active combustion therein, then passing through the conduit in a direction counter current to the travel of the combustion gases through the conduit a mixture of hydrocarbon gases with oxygen and steam so proportioned that the carbon in the mixture will bear the desired ratio to the hydrogen produced and the oxygen as such and in the steam will be adequate to oxidize the carbon in the hydrocarbons to carbon monoxide, passing the resultant gases through a regenerator chamber having a filling of refractory material, withdrawing the gases, then passing the air which supports combustion in the subsequent reheating cycle through the regenerator in a direction counter current to the travel of the conserved gas.

In testimony whereof, I have signed my name to this specification.

WILLIAM D. WILCOX.